(12) United States Patent
Yu et al.

(10) Patent No.: US 11,139,506 B2
(45) Date of Patent: Oct. 5, 2021

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Sung Hoon Yu, Daejeon (KR); Yoo Sun Kang, Daejeon (KR)

(73) Assignee: LG Chem, Ltd.

( * ) Notice: Subject to any disclaimer, the term of this patent is extended or adjusted under 35 U.S.C. 154(b) by 146 days.

(21) Appl. No.: 16/328,308

(22) PCT Filed: Feb. 1, 2018

(86) PCT No.: PCT/KR2018/001413
§ 371 (c)(1),
(2) Date: Feb. 26, 2019

(87) PCT Pub. No.: WO2018/212429
PCT Pub. Date: Nov. 22, 2018

(65) Prior Publication Data
US 2019/0214683 A1 Jul. 11, 2019

(30) Foreign Application Priority Data
May 17, 2017 (KR) .......................... 10-2017-0061201

(51) Int. Cl.
| | |
|---|---|
| *H01M 10/0567* | (2010.01) |
| *H01M 10/0568* | (2010.01) |
| *C07F 9/6574* | (2006.01) |
| *H01M 10/0569* | (2010.01) |
| *H01M 10/0525* | (2010.01) |
| *H01M 10/44* | (2006.01) |
| *H01M 4/48* | (2010.01) |
| *H01M 4/587* | (2010.01) |
| *H01M 4/36* | (2006.01) |

(52) U.S. Cl.
CPC ....... *H01M 10/0567* (2013.01); *C07F 9/6574* (2013.01); *H01M 4/364* (2013.01); *H01M 4/483* (2013.01); *H01M 4/587* (2013.01); *H01M 10/0525* (2013.01); *H01M 10/0568* (2013.01); *H01M 10/0569* (2013.01); *H01M 10/44* (2013.01); *H01M 2300/0025* (2013.01); *H01M 2300/0028* (2013.01)

(58) Field of Classification Search
CPC ......... H01M 10/0567; H01M 10/0568; H01M 10/0569; C07F 9/6574
See application file for complete search history.

(56) References Cited

U.S. PATENT DOCUMENTS

| | | | |
|---|---|---|---|
| 6,379,846 | B1 | 4/2002 | Terahara et al. |
| 2012/0244445 | A1 | 9/2012 | Han et al. |
| 2012/0315536 | A1* | 12/2012 | Bhat ................. H01M 10/0567 |
| | | | 429/199 |
| 2013/0034759 | A1 | 2/2013 | Funada et al. |
| 2014/0011081 | A1 | 1/2014 | Ahn et al. |
| 2014/0272607 | A1 | 9/2014 | Amine et al. |
| 2015/0236380 | A1 | 8/2015 | Garsuch et al. |

FOREIGN PATENT DOCUMENTS

| | | |
|---|---|---|
| CN | 102916223 A | 2/2013 |
| CN | 103326068 A | 9/2013 |
| CN | 104025353 A | 9/2014 |
| CN | 105280954 A | 1/2016 |
| CN | 105541789 A | 5/2016 |
| CN | 105977525 A | 9/2016 |
| EP | 1037293 A1 | 9/2000 |
| JP | H1167232 A | 3/1999 |
| JP | H111283669 A | 10/1999 |
| JP | 2001338679 A | 12/2001 |
| JP | 4940625 B2 | 5/2012 |
| JP | 2013157280 A | 8/2013 |
| JP | 2015099660 A | 5/2015 |
| KR | 20060014280 A | 2/2006 |
| KR | 20150097657 A | 8/2015 |
| WO | 2006016733 A1 | 2/2006 |

OTHER PUBLICATIONS

International Search Report for PCT/KR2018/001413 dated May 14, 2018.
Supplementary Partial European Search Report for EP18802453 dated Sep. 30, 2019.
Extended European Search Report for Application No. 18802453.3, dated Mar. 16, 2021, 15 pages.
Yim T, Woo SG, Lim SH, Cho W, Song JH, Han YK, Kim YJ. 5V-class high-voltage batteries with over-lithiated oxide and a multi-functional additive. Journal of Materials Chemistry A. 2015;3(11):6157-67.
Search Report from Office Action for Chinese Application No. 2018800035420 dated Jun. 25, 2021; 3 pages.

* cited by examiner

*Primary Examiner* — Jonathan G Jelsma
(74) *Attorney, Agent, or Firm* — Lerner, David, Littenberg, Krumholz & Mentlik, LLP

(57) ABSTRACT

The present invention relates to a non-aqueous electrolyte solution for a lithium secondary battery and a lithium secondary battery including the same, and particularly, to a non-aqueous electrolyte solution for a lithium secondary battery which includes a fluorine-containing compound capable of forming a stable film on the surface of an electrode as an additive, and a lithium secondary battery including the same.

10 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/001413 filed Feb. 1, 2018, which claims priority from Korean Patent Application No. 10-2017-0061201 filed May 17, 2017, all of which are incorporated herein by reference.

The present invention relates to a non-aqueous electrolyte solution additive, and a non-aqueous electrolyte solution for a lithium secondary battery and a lithium secondary battery which include the same, and particularly, to a non-aqueous electrolyte solution for a lithium secondary battery and a lithium secondary battery which include an additive capable of forming a stable film on the surface of an electrode.

BACKGROUND ART

In line with miniaturization, lightweight, thin profile, and portable trends in electronic devices according to the development of information and telecommunications industry, the need for high energy density batteries used as power sources of such electronic devices has increased.

Lithium secondary batteries, as batteries that may best meet the need, have been adopted as power sources of many portable devices due to high energy density and ease of design.

Recently, a lithium secondary battery, which may maintain excellent performance not only at room temperature but also in a more severe outside environment such as a high-temperature or low-temperature environment, is required as the range of the lithium secondary batteries used has expanded from conventional small electronic devices to large electronic devices, cars, or smart grids.

A lithium secondary battery is composed of a carbon material negative electrode capable of intercalating and deintercalating lithium ions, a positive electrode formed of a lithium-containing transition metal oxide, and a non-aqueous electrolyte solution, wherein charge and discharge may be possible, because lithium ions, which are discharged from a positive electrode active material by first charging, may play a role in transferring energy while moving between both electrodes, for example, the lithium ions are intercalated into a negative electrode active material, for example, carbon particles, and deintercalated during discharging.

However, performance degradation of the positive electrode occurs while the positive electrode active material is structurally collapsed as the charge and discharge proceed. Also, metal ions eluted from the surface of the positive electrode during the collapse of the positive electrode structure may degrade the negative electrode while the metal ions are electrodeposited on the negative electrode. Such a battery performance degradation phenomenon tends to be more accelerated when the potential of the positive electrode is increased or the battery is exposed to high temperature.

Thus, there is a need to develop a lithium secondary battery having a new configuration which may address the above limitations.

PRIOR ART DOCUMENT

Patent Documents (Patent Document 1) Japanese Patent No. 4940625
(Patent Document 2) Chinese Patent Application Laid-open Publication No. 103326068

DISCLOSURE OF THE INVENTION

Technical Problem

An aspect of the present invention provides a non-aqueous electrolyte solution for a lithium secondary battery which includes a non-aqueous electrolyte solution additive capable of forming a stable film on the surface of an electrode.

Another aspect of the present invention provides a lithium secondary battery in which overall performance, such as cycle life characteristics, are improved by including the non-aqueous electrolyte solution for a lithium secondary battery.

Technical Solution

According to an aspect of the present invention, there is provided a non-aqueous electrolyte solution for a lithium secondary battery including:

a lithium salt, an organic solvent, and a non-aqueous electrolyte solution additive represented by Formula 1.

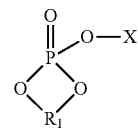

[Formula 1]

In Formula 1,

X is a linear or nonlinear alkyl group having 1 to 5 carbon atoms or $-SiR_2R_3R_4$, wherein $R_2$ to $R_4$ are each independently an alkyl group having 1 to 5 carbon atoms, and $R_1$ is an alkylene group having 2 to 3 carbon atoms which is substituted with at least one fluorine atom, or an alkylene group having 2 to 3 carbon atoms which is substituted with an alkyl group having 1 to 3 carbon atoms that includes at least one fluorine atom.

Specifically, X is $-SiR_2R_3R_4$, wherein $R_2$ to $R_4$ are each independently an alkyl group having 1 to 5 carbon atoms, and $R_1$ is an alkylene group having 2 carbon atoms which is substituted with at least one fluorine atom, or an alkylene group having 2 carbon atoms which is substituted with an alkyl group having 1 to 3 carbon atoms that includes at least one fluorine atom.

The non-aqueous electrolyte solution additive may be included in an amount of 0.1 wt % to 10 wt %, for example, 0.5 wt % to 5 wt % based on a total weight of the non-aqueous electrolyte solution.

According to another aspect of the present invention, there is provided a lithium secondary battery including a negative electrode, a positive electrode, a separator disposed between the negative electrode and the positive electrode, and the non-aqueous electrolyte solution of the present invention.

The negative electrode may include a single material selected from the group consisting of a carbon-based active material, a silicon-based active material, a metal-based active material alloyable with lithium, and a lithium-containing nitride, or a mixture of two or more thereof.

Advantageous Effects

According to an embodiment of the present invention, in a case in which a fluorine-containing compound is included in a non-aqueous electrolyte solution, since an inorganic component, such as LiF, is increased in the non-aqueous electrolyte solution, a more stable ionic conductive film may be formed on surfaces of a negative electrode and a positive electrode. Furthermore, in a case in which a negative electrode including a silicon-based negative electrode active material as well as the non-aqueous electrolyte solution including the fluorine-containing compound is used, a lithium secondary battery having more improved overall performance, such as cycle life characteristics, may be prepared.

MODE FOR CARRYING OUT THE INVENTION

Hereinafter, the present invention will be described in more detail.

It will be understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

In a lithium secondary battery among electrochemical devices, a kind of passivation layer is formed at a positive electrode of the battery, particularly, at a position where surface bonding exists or at an activated position by an electrochemical oxidation decomposition reaction, wherein the passivation layer increases impedance when lithium ions are co-intercalated into a positive electrode active material. Also, while an excessive amount of lithium ions is discharged from the positive electrode during overcharge or high-temperature storage, structural collapse of the positive electrode active material or a chemical dissolution reaction by an electrolyte solution occurs so that ions, such as cobalt (Co), manganese (Mn), and nickel (Ni), are eluted from the positive electrode active material. These reactions not only lead to performance degradation of the positive electrode itself, but also cause the collapse of the positive structure as well as an electrolyte solution side reaction to degrade overall performance of the secondary battery.

The present invention aims at providing a non-aqueous electrolyte solution including a fluorine-containing compound as an additive, and, furthermore, aims at providing a lithium secondary battery, in which overall performance, such as cycle life characteristics, of the battery are improved by forming a stable film on surfaces of positive electrode and negative electrode, by including the non-aqueous electrolyte solution.

Specifically, in an embodiment of the present invention, provided is a non-aqueous electrolyte solution for a lithium secondary battery including:

a lithium salt, an organic solvent, and a non-aqueous electrolyte solution additive represented by Formula 1.

[Formula 1]

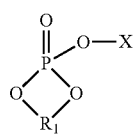

In Formula 1,

X is a linear or nonlinear alkyl group having 1 to 5 carbon atoms or $-SiR_2R_3R_4$, wherein $R_2$ to $R_4$ are each independently an alkyl group having 1 to 5 carbon atoms, and $R_1$ is an alkylene group having 2 to 3 carbon atoms which is substituted with at least one fluorine atom, or an alkylene group having 2 to 3 carbon atoms which is substituted with an alkyl group having 1 to 3 carbon atoms that includes at least one fluorine atom.

Specifically, in Formula 1, X is $-SiR_2R_3R_4$, wherein $R_2$ to $R_4$ are each independently an alkyl group having 1 to 5 carbon atoms, and $R_1$ is an alkylene group having 2 carbon atoms which is substituted with at least one fluorine atom, or an alkylene group having 2 carbon atoms which is substituted with an alkyl group having 1 to 3 carbon atoms that includes at least one fluorine atom.

Specific examples of the compound represented by Formula 1 may be at least one compound selected from the group consisting of compounds represented by Formulae 1a to 1h below.

(Formula 1a)
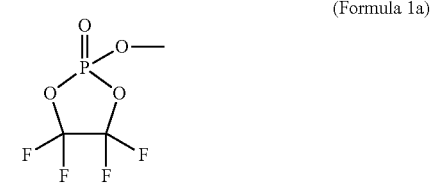

(Formula 1b)
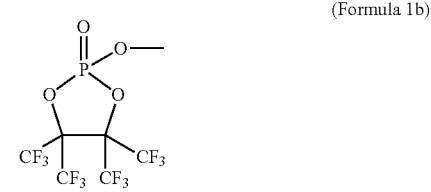

(Formula 1c)
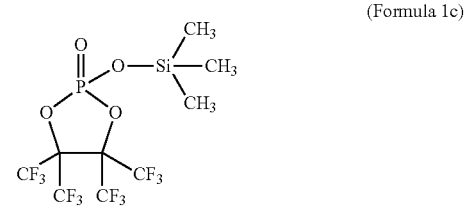

(Formula 1d)

(Formula 1e)
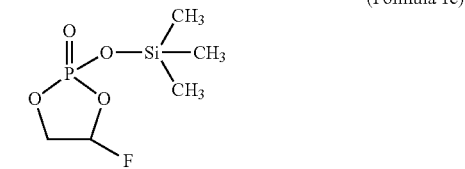

(Formula 1f)
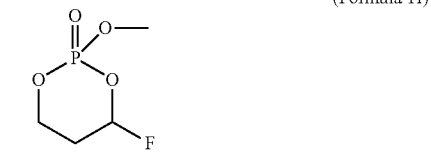

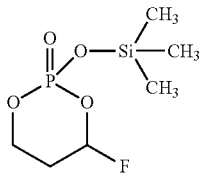
(Formula 1g)

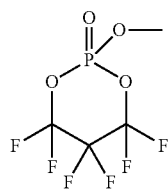
(Formula 1h)

In a case in which the compound containing at least one fluorine atom is included as the non-aqueous electrolyte solution additive with the compound represented by Formula 1 in the structure, an amount of an inorganic component, such as LiF, is increased in the non-aqueous electrolyte solution. As a result, fluorine (F) improves a bonding effect, for example, agglomeration of organic components for forming an SEI to each other or a good attachment of the organic components for forming an SEI to a surface of an active material, by a reaction in which the fluorine is coordination bonded with lithium (Li) ions of the organic SEI component, and thus, a more stable ionic conductive film may be formed on the surfaces of the negative electrode and the positive electrode.

In particular, with respect to the compounds having a Si—O bond among the compounds represented by Formulae 1a to 1h, it is advantageous in that they may also play a role as a HF scavenger. Furthermore, 5-cyclic materials may achieve slightly better overall performance than 6-cyclic materials due to structural stability of a ring.

With respect to fluoroethylene carbonate (FEC) that is typically known as an additive for improving the amount of the LIF component, it is known that a large amount of gas may be generated because the FEC is decomposed in the electrolyte solution during high-temperature storage. In contrast, with respect to the compound having a phosphate structure of the present invention, gas generation is not only low, but it may also have an effect of stabilizing an anion of the lithium salt, for example, $PF_6^-$. Thus, the compound having a phosphate structure of the present invention may further improve life and high-temperature storage characteristics in comparison to a carbonate-based compound such as FEC.

In a case in which the non-aqueous electrolyte solution additive is included in an amount of about 0.1 wt % to about 10 wt %, for example, 0.5 wt % to 5 wt % based on a total weight of the non-aqueous electrolyte solution, a secondary battery having more improved overall performance may be prepared. Specifically, in a case in which the amount of the additive is 0.1 wt % or more, a better film-forming effect may be obtained, and, in a case in which the amount of the additive is 10 wt % or less, a decrease in capacity of the battery due to a side reaction of the surplus of the non-aqueous electrolyte solution additive, an increase in viscosity of the electrolyte solution, the resulting increase in resistance, and an ionic conductivity reduction phenomenon may be prevented.

In an embodiment, any lithium salt typically used in an electrolyte solution for a lithium secondary battery may be used as the lithium salt included in the non-aqueous electrolyte solution of the present invention without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. One or, if necessary, a mixture of two or more thereof may be used as the lithium salt. The lithium salt may be appropriately changed in a normally usable range, but may be included in a concentration of 0.8 M to 2.0 M in the electrolyte solution in order to obtain an optimum anti-corrosion film-forming effect on the surface of the electrode.

Also, any organic solvent typically used in an electrolyte solution for a lithium secondary battery may be used as the organic solvent included in the non-aqueous electrolyte solution of the present invention without limitation, and, for example, an ether-based solvent, an ester-based solvent, or an amide-based solvent may be used alone or as a mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

In this case, among the ester-based solvents, since the cyclic carbonate-based compound well dissociates the lithium salt in the electrolyte due to high permittivity as a highly viscous organic solvent, the cyclic carbonate-based compound may be preferably used. Since an electrolyte solution having high electrical conductivity may be prepared when the above cyclic carbonate-based compound is mixed with the low viscosity, low permittivity linear carbonate-based compound, such as dimethyl carbonate and diethyl carbonate, in an appropriate ratio, the cyclic carbonate-based compound may be more preferably used.

The non-aqueous electrolyte solution of the present invention may further include an additive for forming a solid electrolyte interface (SEI), if necessary. As the additive for forming an SEI which may be used in the present invention, at least one of vinylene carbonate, fluoroethylene carbonate, vinyl ethylene carbonate, cyclic sulfite, saturated sultone, unsaturated sultone, a non-cyclic sulfone, an alkylsilyl compound, and an inorganic additive may be mixed and used.

In a case in which the additive for forming an SEI is included, the film-forming effect may be further improved when the additive for forming an SEI is included in an amount of about 0.01 wt % or more based on a total amount of the non-aqueous electrolyte solution.

Among the additives for forming an SEI, typical examples of the cyclic sulfite may be ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, or 1,3-butylene glycol sulfite.

Among the additives for forming an SEI, typical examples of the saturated sultone may be 1,3-propane sultone and 1,4-butane sultone, and the unsaturated sultone may include ethene sultone, 1,3-propene sultone, 1,4-butene sultone, or 1-methyl-1,3-propene sultone.

Among the additives for forming an SEI, typical examples of the non-cyclic sulfone may be divinyl sulfone, dimethyl sulfone, diethyl sulfone, methyl ethyl sulfone, or methyl vinyl sulfone.

Among the additives for forming an SEI, typical examples of the alkylsilyl compound may be tris(trimethylsilyl) phosphate, tris(trimethylsilyl) phosphite, tris(triethylsilyl) phosphate, tris(triethylsilyl) phosphite, tris(trimethylsilyl) borate, or tris(triethylsilyl) borate.

Among the additives for forming an SEI, typical examples of the inorganic additive may be lithium tetrafluoroborate, lithium difluoro(bisoxalate) phosphate, lithium difluoro phosphate, lithium tetrafluorooxalato phosphate, lithium bis(fluorosulfonyl)imide, lithium bis(trifluoromethyl sulfonyl)imide, lithium oxalyldifluoroborate, or lithium bis (oxalato)borate.

Also, in an embodiment of the present invention, provided is a lithium secondary battery including a positive electrode, a negative electrode, a separator disposed between the positive electrode and the negative electrode, and a non-aqueous electrolyte solution, wherein the non-aqueous electrolyte solution includes the non-aqueous electrolyte solution of the present invention.

Specifically, the lithium secondary battery of the present invention may be prepared by injecting the non-aqueous electrolyte solution of the present invention into an electrode assembly composed of the positive electrode, the negative electrode, and the separator disposed between the positive electrode and the negative electrode. In this case, any positive electrode, negative electrode, and separator, which have typically been used in the preparation of a lithium secondary battery, may be used as the positive electrode, negative electrode, and separator which constitute the electrode assembly.

In this case, the positive electrode may be prepared by forming a positive electrode material mixture layer on a positive electrode collector.

The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$) etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$) or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.2}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt % based on a total weight of solid content in the positive electrode slurry.

The conductive agent is commonly added in an amount of 1 wt % to 30 wt % based on the total weight of the solid content in the positive electrode slurry.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 50 wt % to 95 wt %, for example, 70 wt % to 90 wt %.

Also, the negative electrode may be prepared by forming a negative electrode material mixture layer on a negative electrode collector.

The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

A compound capable of reversibly intercalating and deintercalating lithium may be used as the negative electrode active material. Specific examples of the negative electrode active material may include a single material selected from the group consisting of a carbon-based active material, a silicon-based active material, a metal-based active material alloyable with lithium, and a lithium-containing nitride, or a mixture of two or more thereof.

Typical examples of the carbon-based active material may include natural graphite, artificial graphite, expanded graphite, carbon fibers, non-graphitizable, carbon, carbon black, carbon nanotubes, fullerene, or activated carbon, and the carbon-based active material may be used without limitation as long as it is conventionally used in a carbon material for a lithium secondary battery.

Typical examples of the silicon-based active material may include at least one selected from the group consisting of silicon, an alloy with silicon, $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0.5 \le v \le 1.2$), and LiSiO.

Typical examples of the metal-based active material may include compounds containing at least one metallic element selected from the group consisting of Al, tin (Sn), silver (Ag), bismuth (Bi), Mg, zinc (Zn), indium (In), germanium (Ge), lead (Pb), palladium (Pd), platinum (Pt), Ti, antimony (Sb), gallium (Ga), Mn, Fe, Co, Ni, copper (Cu), strontium (Sr), and barium (Ba). The metallic compounds may be used in any form, such as a simple substance, an alloy, an oxide ($TiO_2$, $SnO_2$, etc), a nitride, a sulfide, a boride, or an alloy with lithium, but the simple substance, alloy, oxide, and alloy with lithium may have high capacity.

In a case in which a negative electrode including the silicon-based active material or both of the silicon-based active material and the carbon-based active material, as the negative electrode active material, is used, a lithium secondary battery having improved overall performance, such as cycle life characteristics, may be prepared. That is, with respect to the silicon-based active material, since a change in volume is very large during charge and discharge, stability of the SEI is significantly reduced. In contrast, in a case in which the non-aqueous electrolyte solution including the additive of the present invention is used, since a sufficient SEI capable of compensating for the shortcomings of the silicon-based active material may be formed as the amount of LiF in the non-aqueous electrolyte solution is increased, an effect of improving lifetime of the secondary battery using the silicon-based active material is more significant.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 95 wt %, for example, 70 wt % to 90 wt %.

Also, a typical porous polymer film conventionally used as a separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

After ethylene carbonate (EC) and ethyl methyl carbonate (EMC) were mixed in a ratio of 30:70 (vol %), an organic mixed solution was prepared by dissolving $LiPF_6$ to a concentration of 1 M.

The organic mixed solution and the additive of the present invention were added as listed in the following Table 1 to prepare a non-aqueous electrolyte solution.

(Positive Electrode Preparation)

40 parts by weight of a solid, in which a ternary active material ($Li(Ni_{0.5}Mn_{0.3}Co_{0.2})O_2$), carbon black as a conductive agent, and polyvinylidene fluoride (PVDF) as a binder, were mixed in a ratio of 90:5:5 (wt %), was added to 100 parts by weight of N-methyl-2-pyrrolidone (NMP) to prepare a positive electrode active material slurry. A 100 μm thick positive electrode collector (Al thin film) was coated with the positive electrode active material slurry, dried, and roll-pressed to prepare a positive electrode.

(Negative Electrode Preparation)

100 parts by weight of a solid, in which natural graphite and $SiO_x$ (0<x<1), as a negative electrode active material, PVDF as a binder, and carbon black as a conductive agent, were mixed in a ratio of 90:5:2:3 (wt %), was added to 100 parts by weight of NMP to prepare a negative electrode active material slurry. A 90 μm thick negative electrode collector (Cu thin film) was coated with the negative electrode active material slurry, dried, and roll-pressed to prepare a negative electrode.

(Secondary Battery Preparation)

After an electrode assembly was prepared by stacking a polyethylene porous film with the positive electrode and negative electrode prepared by the above-described methods, the electrode assembly was put in a pouch-type battery case, the non-aqueous electrolyte solution thus prepared was injected thereinto, and the battery case was sealed to prepare a lithium secondary battery.

Examples 2 to 13

Electrolyte solutions and secondary batteries including the same were respectively prepared in the same manner as in Example 1 except that additives were respectively included in amounts listed in the following Table 1 during the preparation of the non-aqueous electrolyte solution in Example 1.

Comparative Example 1

A non-aqueous electrolyte solution and a secondary battery including the same were prepared in the same manner as in Example 1 except that an additive was not included during the preparation of the non-aqueous electrolyte solution in Example 1.

Comparative Example 2

A non-aqueous electrolyte solution and a secondary battery including the same were prepared in the same manner as in Example 1 except that 0.5 g of a compound of the following Formula 2, instead of the compound of Formula 1a, was included during the preparation of the non-aqueous electrolyte solution in Example 1.

[Formula 2]

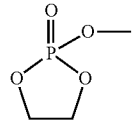

Comparative Example 3

A non-aqueous electrolyte solution and a secondary battery including the same were prepared in the same manner as in Example 1 except that 3 g of fluoroethylene carbonate, instead of the compound of Formula 1a, was included during the preparation of the non-aqueous electrolyte solution in Example 1.

EXPERIMENTAL EXAMPLES

Experimental Example 1

Each of the secondary batteries prepared in Examples 1 to 13 and Comparative Examples 1 to 3 was charged at a 0.8 C rate to 4.35 V under a constant current/constant voltage condition, cut-off charged at 0.05 C, and discharged at 0.5 C to a voltage of 3.0 V (initial discharge capacity). Subsequently, after each of the secondary batteries was charged at a 0.8 C rate to 4.35 V under a constant current/constant voltage condition, cut-off charged at 0.05 C, and stored at 60° C. for 2 weeks, a thickness increase rate was confirmed by measuring a thickness of the pouch type battery. Thereafter, each battery was discharged at 0.5 C to a voltage of 3.0 V at room temperature and discharge capacity was measured (residual discharge capacity). Again, each battery was charged at a 0.8 C rate to 4.35 V under a constant current/constant voltage condition, cut-off charged at 0.05 C, and discharged at 0.5 C to a voltage of 3.0 V to measure discharge capacity (recovery discharge capacity).

The thickness increase rate was expressed as a percentage (%) relative to an initial thickness, the residual discharge capacity and the recovery discharge capacity were expressed as a percentage (%) relative to the initial discharge capacity, and the results thereof are presented in the following Table 1.

Experimental Example 2

Each of the secondary batteries prepared in Examples 1 to 13 and Comparative Examples 1 to 3 was charged at a 0.8 C rate to 4.35 V under a constant current/constant voltage condition, cut-off charged at 0.05 C, and discharged at 0.5 C to a voltage of 3.0 V. Subsequently, charging at a 0.8 C rate to 4.35 V under a constant current/constant voltage condition, cut-off charging at 0.05 C, and discharging at 0.5 C to a voltage of 3.0 V at room temperature were set as one cycle, and cycle capacity retention after 200 cycles was expressed as a percentage (%) relative to first cycle capacity and listed in Table 1 below.

had the Si—O bond, it may be understood that the battery thickness increase rates during high-temperature storage, residual discharge capacities, recovery discharge capacities, and cycle capacity retentions were better than those of the secondary batteries of Example 2, 4, and 6 respectively including the compounds represented by Formulae 1b, 1d, and 1f which did not have the Si—O bond.

Furthermore, with respect to the secondary batteries of Examples 1 to 11 which respectively included the non-aqueous electrolyte solutions including the compound of the present invention as an additive, since gas generation was reduced in comparison to the secondary battery of Comparative Example 3 which included the non-aqueous electrolyte solution using FEC as an additive, it may be understood that the battery thickness increase rates during high-temperature storage were significantly reduced.

Also, it may be understood that the secondary batteries of Examples 1 to 11 of the present invention had better battery thickness increase rates during high-temperature storage, residual discharge capacities, recovery discharge capacities, and cycle capacity retentions than the secondary battery of Comparative Example 2 which included the non-aqueous electrolyte solution using the phosphate-based compound of Formula 2 without fluorine as an additive.

TABLE 1

| Examples | Organic mixed solution amount (g) | Additive Formula | Amount (g) | Thickness increase rate (%) | Residual discharge capacity (%) | Recovery discharge capacity (%) | Cycle capacity retention (%) |
|---|---|---|---|---|---|---|---|
| Example 1 | 99.5 | 1a | 0.5 | 105 | 91 | 97 | 83 |
| Example 2 | 99.5 | 1b | 0.5 | 105 | 91 | 96 | 81 |
| Example 3 | 99.5 | 1c | 0.5 | 104 | 94 | 98 | 85 |
| Example 4 | 99.5 | 1d | 0.5 | 107 | 92 | 97 | 84 |
| Example 5 | 99.5 | 1e | 0.5 | 105 | 95 | 98 | 87 |
| Example 6 | 99.5 | 1f | 0.5 | 106 | 89 | 94 | 78 |
| Example 7 | 99.5 | 1g | 0.5 | 103 | 91 | 96 | 81 |
| Example 8 | 99.5 | 1h | 0.5 | 104 | 89 | 95 | 84 |
| Example 9 | 97 | 1a | 3 | 109 | 93 | 98 | 87 |
| Example 10 | 90 | 1a | 10 | 112 | 94 | 96 | 80 |
| Example 11 | 99.95 | 1a | 0.05 | 118 | 84 | 90 | 68 |
| Example 12 | 87 | 1a | 13 | 125 | 88 | 92 | 47 |
| Example 13 | 99.0 | 1a/VC | 0.5/0.5 | 108 | 93 | 99 | 87 |
| Comparative Example 1 | 100 | X | X | 121 | 82 | 88 | 65 |
| Comparative Example 2 | 99.5 | 2 | 0.5 | 110 | 86 | 90 | 73 |
| Comparative Example 3 | 97 | FEC | 3 | 136 | 88 | 92 | 79 |

As illustrated in Table 1, with respect to the secondary batteries of Examples 1 to 11 which respectively included the non-aqueous electrolyte solutions including the compound of the present invention as an additive, it may be understood that battery thickness increase rates during high-temperature storage, residual discharge capacities, recovery discharge capacities, and cycle capacity retentions were better than those of the secondary battery of Comparative Example 1 which included the non-aqueous electrolyte solution in which the additive was not used.

Also, with respect to the compounds having a Si—O bond among the compounds represented by Formulae 1a to 1h, it was advantageous in that they may also play a role as a HF scavenger. Thus, with respect to the secondary batteries of Examples 3, 5, and 7 which respectively included the non-aqueous electrolyte solutions respectively including the compounds represented by Formulae 1c, 1e, and 1g which

The invention claimed is:

1. A non-aqueous electrolyte solution for a lithium secondary battery, the non-aqueous electrolyte solution comprising:
a lithium salt,
an organic solvent, and
a non-aqueous electrolyte solution additive represented by Formula 1:

[Formula 1]

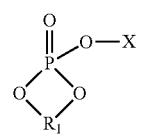

wherein, in Formula 1,

X is SiR$_2$R$_3$R$_4$, wherein R$_2$ to R$_4$ are each independently an alkyl group having 1 to 5 carbon atoms, and R$_1$ is an alkylene group having 2 to 3 carbon atoms which is substituted with at least one fluorine atom, or an alkylene group having 2 to 3 carbon atoms which is substituted with an alkyl group having 1 to 3 carbon atoms that includes at least one fluorine atom.

2. The non-aqueous electrolyte solution for a lithium secondary battery of claim 1, wherein, in Formula 1, R$_1$ is an alkylene group having 2 carbon atoms which is substituted with at least one fluorine atom, or an alkylene group having 2 carbon atoms which is substituted with an alkyl group having 1 to 3 carbon atoms that includes at least one fluorine atom.

3. The non-aqueous electrolyte solution for a lithium secondary battery of claim 1, wherein the non-aqueous electrolyte solution additive comprises at least one selected from the group consisting of compounds represented by Formulae 1c, 1e and 1g:

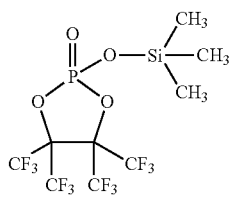
(Formula 1c)

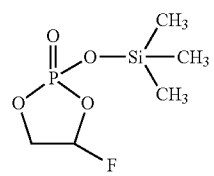
(Formula 1e)

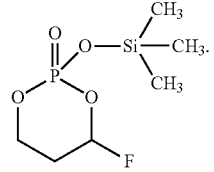
(Formula 1g)

4. The non-aqueous electrolyte solution for a lithium secondary battery of claim 1, wherein the non-aqueous electrolyte solution additive is included in an amount of 0.1 wt % to 10 wt % based on a total weight of the non-aqueous electrolyte solution.

5. The non-aqueous electrolyte solution for a lithium secondary battery of claim 1, wherein the non-aqueous electrolyte solution additive is included in an amount of 0.5 wt % to 5 wt % based on a total weight of the non-aqueous electrolyte solution.

6. The non-aqueous electrolyte solution for a lithium secondary battery of claim 1, the lithium salt comprises Li$^+$, as a cation, and at least one selected from the group consisting of F$^-$, Cl$^-$, Br$^-$, I$^-$, NO$_3^-$, N(CN)$_2^-$, BF$_4^-$, ClO$_4^-$, AlO$_4^-$, AlCl$_4^-$, PF$_6^-$, SbF$_6^-$, AsF$_6^-$, BF$_2$C$_2$O$_4^-$, BC$_4$O$_8^-$, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, CF$_3$SO$_3^-$, C$_4$F$_9$SO$_3^-$, CF$_3$CF$_2$SO$_3^-$, (CF$_3$SO$_2$)$_2$N$^-$, (FSO$_2$)$_2$N$^-$, CF$_3$CF$_2$(CF$_3$)$_2$CO$^-$, (CF$_3$SO$_2$)$_2$CH$^-$, CF$_3$(CF$_2$)$_7$SO$_3^-$, CF$_3$CO$_2^-$, CH$_3$CO$_2^-$, SCN$^-$, and (CF$_3$CF$_2$SO$_2$)$_2$N$^-$ as an anion.

7. The non-aqueous electrolyte solution for a lithium secondary battery of claim 1, wherein the organic solvent comprises one selected from the group consisting of an ether-based solvent, an ester-based solvent, and an amide-based solvent, or a mixture of two or more thereof.

8. The non-aqueous electrolyte solution for a lithium secondary battery of claim 7, wherein the ester-based solvent comprises at least one compound selected from the group consisting of a cyclic carbonate compound, a linear carbonate compound, a linear ester compound, and a cyclic ester compound.

9. A lithium secondary battery comprising a negative electrode, a positive electrode, a separator disposed between the negative electrode and the positive electrode, and a non-aqueous electrolyte solution, wherein the non-aqueous electrolyte solution comprises the non-aqueous electrolyte solution for a lithium secondary battery of claim 1.

10. The lithium secondary battery of claim 9, wherein the negative electrode comprises a single material selected from the group consisting of a carbon-based active material, a silicon-based active material, a metal-based active material, and a lithium-containing nitride, or a mixture of two or more thereof.

* * * * *